United States Patent [19]

Foster et al.

[11] 4,349,326
[45] Sep. 14, 1982

[54] APPARATUS FOR MANUFACTURING ARTICLES BY PRESSING AND SINTERING

[76] Inventors: Robert D. Foster, 1116 Waugh Dr. #4, Houston, Tex. 77019; Frank G. Weeden, P.O. Box 55156, Houston, Tex. 77055

[21] Appl. No.: 201,015

[22] Filed: Oct. 27, 1980

Related U.S. Application Data

[62] Division of Ser. No. 951,717, Oct. 16, 1978, Pat. No. 4,252,760.

[51] Int. Cl.³ .............................................. B29C 6/02
[52] U.S. Cl. ............................................... 425/405 R
[58] Field of Search .................................... 425/405 R

[56] References Cited

U.S. PATENT DOCUMENTS

| | | | |
|---|---|---|---|
| 2,447,434 | 8/1948 | Schwarzkopf | 425/405 |
| 3,897,531 | 7/1975 | Overhoff et al. | 264/314 |
| 3,956,452 | 7/1976 | Saito | 264/314 |

*Primary Examiner*—James R. Hall
*Attorney, Agent, or Firm*—Browning, Bushman, Zamecki & Anderson

[57] ABSTRACT

The invention pertains to the manufacture of articles of thermosetting plastics and other materials. In a first stage, a solid article is formed from a particulate material by introducing such material into a first chamber defined partially by the backing surface of a backing member and partially by the opposed pressing surface of a pressing member. The backing member is frangible and is removably mounted on a support. The first chamber is then closed and the pressing member advanced toward the backing surface to contract the first chamber and compress the particulate material between the pressing and backing surfaces to form the solid article. The pressing member is then retracted, the first chamber is opened, and the backing member and solid article are removed from the support as a unit. Finally, the backing member is fractured and the fragments are removed from the solid article. In a second stage, the convoluted article, or any other similar body is supported in a chamber structure. A filler is disposed between the body and the chamber structure in contact with at least a major portion of the exposed surfaces of the body. The filler and body are then heated, while restricting movement of the filler.

7 Claims, 6 Drawing Figures

APPARATUS FOR MANUFACTURING ARTICLES BY PRESSING AND SINTERING

This is a division of application Ser. No. 951,717, filed Oct. 16, 1978, now U.S. Pat. No. 4,252,760.

BACKGROUND OF THE INVENTION

1. Field of the Invention

The present invention pertains to the manufacture of solid articles from particulate materials such as powdered tetrafluoroethylenes and similar thermosetting plastics, as well as ceramics, metals and other materials. The individual particles of such powdered plastics are characterized by numerous surface irregularities. Thus, when a compressive force is exerted on a quantity of such a powder, these irregularities are caused to interlock with one another to form a solid article. When the compressive force is applied by fluid pressure via a diaphragm, such a process is known as "isostatic molding." The article formed by such a pressing process, while solid and integral, is porous and/or brittle. However, if this preliminary article, known as a "preform," is heated to a suitable temperature, the plastic sets, resulting in a finished article which is neither porous nor brittle but rather extremely strong and substantially homogenous in texture. The same basic techniques may also be employed in the formation of articles from particulate metals, ceramics, and other materials.

2. Description of the Prior Art

The basic pressing and sintering technique described above is acceptable for the manufacture of many relatively simple types of plastic articles. However, problems are encountered where the finished article is complicated by a convoluted or otherwise irregular configuration, interconnection between the plastic portion of the article and another portion of metal or some other substance, and/or an intended use in an environment in which extremely good physical properties are needed.

For example, with certain types of articles having complex convoluted or otherwise irregular configurations, it has heretofore been considered impossible or at least economically unfeasible to form the article into such convoluted configuration from the original powdered plastic. The problems of providing properly shaped removable mold pieces is particularly acute where, for example, the article is a sleeve or other hollow body which is further internally convoluted. Accordingly, it has been customary to first form a relatively simple body, such as a cylindrical sleeve, by the pressing and sintering methods, and then physically deform the finished cylindrical sleeve into the desired convoluted configuration. In using such a technique, it is necessary to stretch the finished plastic, and the resulting convoluted article thus has a thinner cross-section through the areas which have been so stretched. While these thin-sectioned areas are therefore the weakest points of the finished article, they may be located at precisely the points at which the greatest strength is needed, an obvious disadvantage.

In connection with articles comprised of two interconnected bodies, e.g. one of a thermosetting plastic and one of metal, having incompatible coefficients of thermal expansion, problems may occur in the sintering stage of the manufacturing process. For example, the plastic may tend to expand more than the metal. Then, if the metal and plastic are interengaged in such a way that the metal inhibits expansion of the plastic at the interface of the two, the plastic may buckle along an exposed or free surface distal the metal portion of the article.

Still another problem is that of producing articles which require superior physical properties. In the past, this has been done by actively exerting pressure on the preform as it is being sintered. However, the use of this technique, commonly known as "pressure cooking," is relatively expensive and increases the cost of the finished article.

The same or similar problems may be encountered in the manufacture of articles from particulate materials other than plastics.

SUMMARY OF THE INVENTION

The present invention provides an apparatus by which a convoluted or otherwise irregularly shaped preform may be formed by compaction of a particulate material without undue expense or complication. The invention further comprises improvements which provide a finished article having superior physical properties without the expense and complication of prior "pressure cooking" techniques. Furthermore, with regard to articles comprised of two bodies having incompatible coefficients of thermal expansion, the invention eliminates the problem of buckling of one of the bodies along a free or exposed surface.

More specifically, the invention comprises a press apparatus including a supporting assembly, a frangible backing member removably mounted on the supporting assembly and having a backing surface, and a pressing means mounted on the supporting assembly and having a pressing surface opposed to the backing surface. The backing and pressing surfaces may be convoluted or otherwise irregularly configured in accord with the desired shape of the finished article. The supporting assembly cooperates with the backing member and pressing means to define a first chamber between the backing surface and the pressing surface. In operation, a particulate material such as a powdered thermosetting plastic is introduced into the first chamber. The pressing means is then advanced towards the backing surface to contract the first chamber and compress the particulate material to form a solid preform. The pressing means is then retracted, the chamber opened, and the backing member and preform removed as a unit. The backing member may then be fractured and the fragments removed from the solid preform either before or after sintering.

In preferred embodiments, the pressing means is an elastomeric bladder, or series of bladders, which are advanced and retracted by introducing fluid into a second chamber or chambers located across the pressing means from the backing member and removing fluid from said second chamber(s). The frangible backing member is preferably formed, for example, of plaster-of-Paris or some other relatively inexpensive material. Such backing members are inexpensive enough to permit the use of a new backing member for each article formed in the pressing apparatus.

After a preform body has been manufactured, such body is sintered by first supporting restraining means in contact with at least a major portion of the free surfaces of the body, and then heating the body and the restraining means while restricting movement of the latter. It is not necessary to actively exert pressure on the free surfaces during heating, but rather, only to provide sufficient force for holding the restraining means against such surfaces when cold and resist movement when heated. As the body expands during the heating step, it exerts a sufficient force against the restraining means to substantially improve the physical properties of the resulting sintered article. Additionally, the use of the restraining means will often cause healing of cracks or other defects in a preform, thus permitting use of preforms which would have to have been discarded with other methods.

Where the article in question is comprised of two interconnected bodies formed of respective materials having incompatible coefficients of thermal expansion, the above heating method can be used for the additional or alternative purpose of preventing buckling of one of the bodies along the free surface thereof contacted by the restraining means.

In any event, the heating is preferably accomplished by supporting the article or body in question in a chamber structure and placing a filler into the chamber structure to fill the space between the latter and the free surfaces of the body in question. The filler may be a flowable substance poured into this space whereby the filler contacts and conforms to the free surfaces of the body even though they may be intricately convoluted or otherwise irregular. The filler medium may be one, such as plaster-of-Paris, which is inexpensive and which sets to form a solid filler member. Thus, after the heating process, such filler member can simply be broken away and discarded like the backing member used in the pressing stage of the formation of a convoluted article as described hereinabove.

In that connection, where the article to be sintered is a convoluted article which has been formed in accord with the first stage of the present invention, the backing member used in that stage may be left in place for the heating stage, whereby it is only necessary to pour the filler medium about some of the surfaces of the article to be sintered. If the backing member is annular and is surrounded by the body to be sintered, a mandrel or the like may be provided to fit within the backing member and prevent it from being crushed by the expanding plastic body. Then, after heating, the backing member, plastic body and filler member, may be removed from the chamber structure and the mandrel, and the backing member and filler member may be broken away and discarded.

Accordingly, it is a principal object of the present invention to provide an improved apparatus for manufacturing solid articles from particulate materials.

Another object of the present invention is to provide such an apparatus employing a frangible backing member.

Still other objects, features and advantages of the present invention will be made apparent by the following detailed description of the preferred embodiments, the drawings and the claims.

DESCRIPTION OF THE PREFERRED EMBODIMENTS

Figure 1:
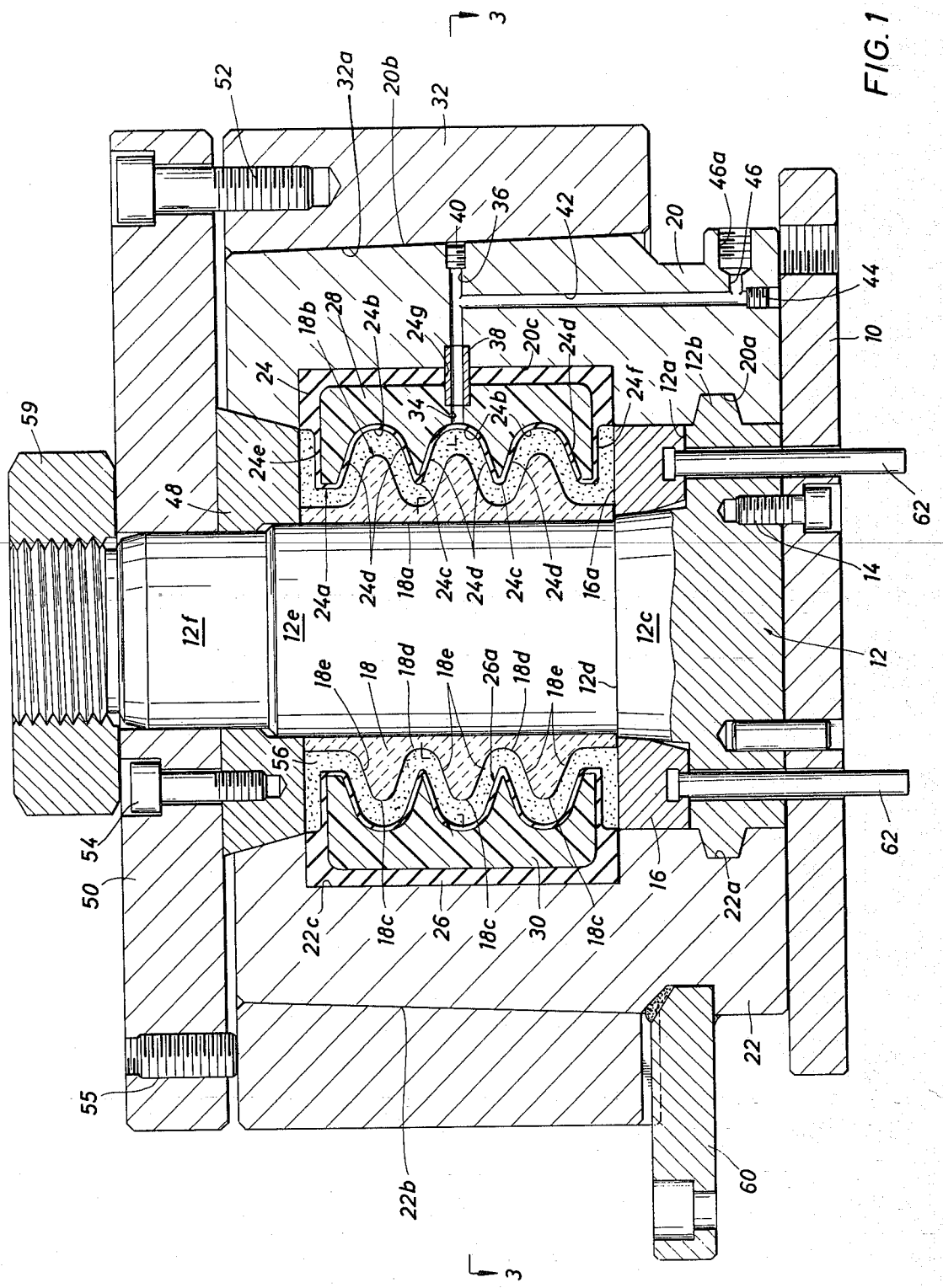
FIG. 1 is a longitudinal sectional view through a press apparatus according to the present invention.
Figure 2:
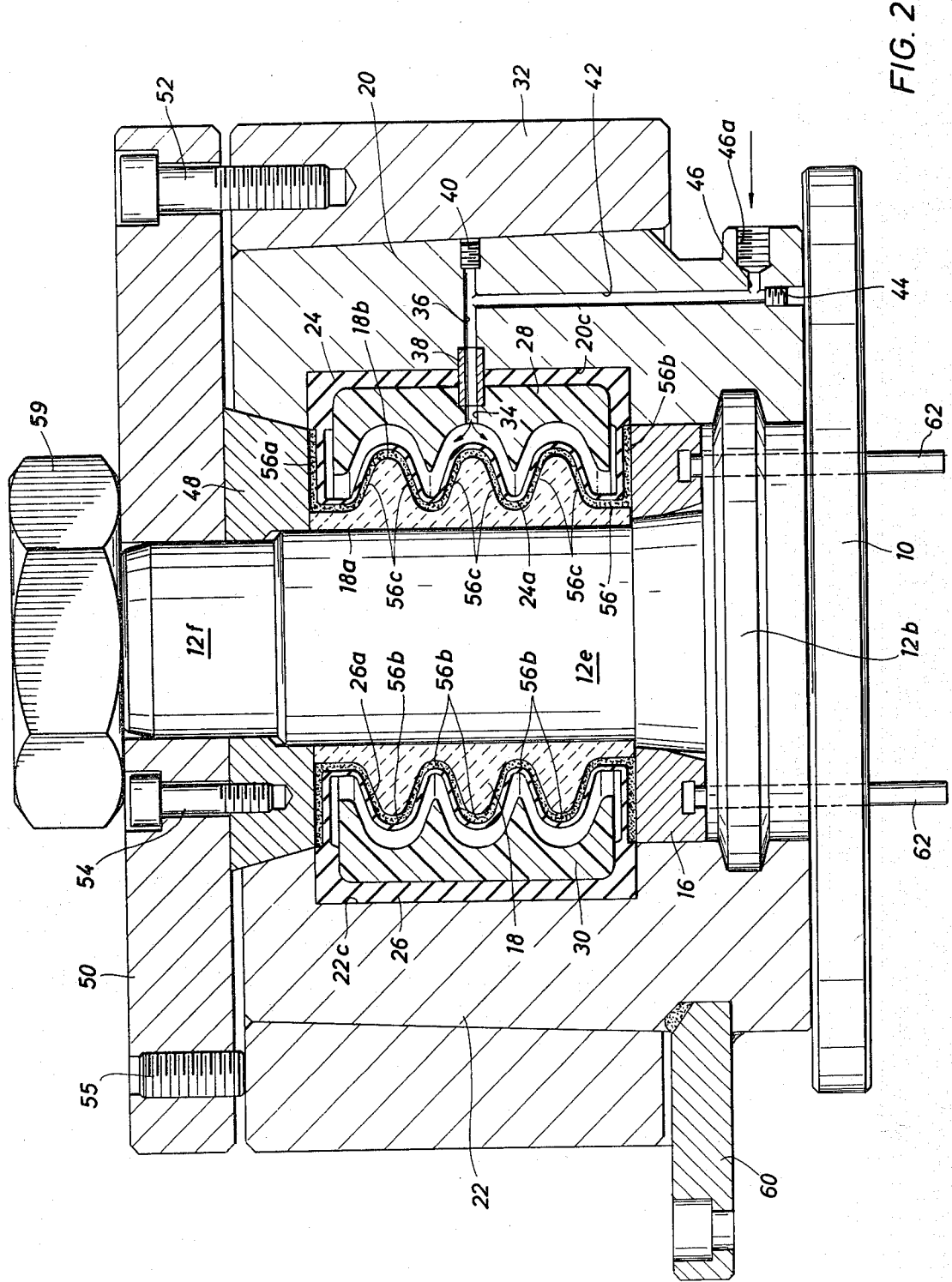
FIG. 2 is a view similar to that of FIG. 1 showing the press apparatus in a different position.
Figure 3:
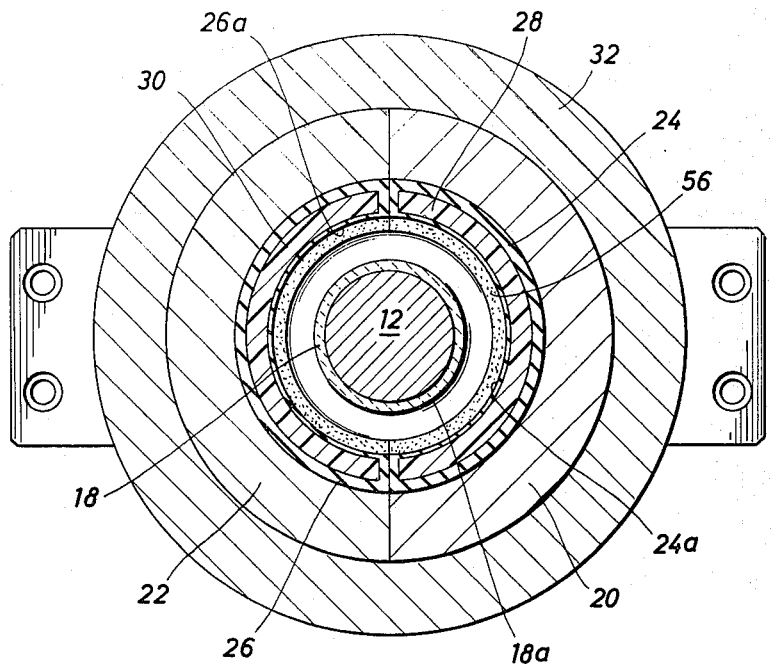
FIG. 3 is a transverse sectional view taken along the lines 3—3 of FIG. 1.

FIGS. 1–3 disclose a press apparatus according to the present invention for forming a convoluted sleeve from a powdered thermosetting plastic material such as a tetrofluoroethylene. Such sleeves are used in the fabrication of expansion joints. The apparatus comprises a supporting assembly including a base plate 10. The supporting assembly further includes a mandrel 12 secured to base plate 10 by bolts 14 and extending upwardly from base plate 10. Mandrel 12 has a large diameter lower portion defining an upwardly facing shoulder 12a and having a bevelled annular flange 12b extending radially outwardly therefrom. Above shoulder 12a, mandrel 12 has a tapered portion 12c. Above portion 12c, the diameter of mandrel 12 is further reduced to form another upwardly facing shoulder 12d and a central cylindrical portion 12e. Above portion 12e, the diameter of mandrel 12 is further reduced to form an upper portion 12f, the upper end of which is externally threaded.

The supporting assembly further comprises a support ring 16 which is emplaced on mandrel 12 so that it rests on shoulder 12a thereof and surrounds tapered portion 12c. Support ring 16 has a planar upper surface 16a which lies in a common plane with shoulder 12d of mandrel 12.

After the base plate 10, mandrel 12, and ring 16 have been assembled as shown, an annular backing member 18 is emplaced over mandrel 12 in surrounding relation to portion 12e and with its lower end resting on shoulders 12d and 16a. Backing member 18 has a cylindrical inner surface 18a sized for a sliding fit on mandrel portion 12e. The radially outwardly directed surface 18b of backing member 18 has a convoluted configuration. More specifically, surface 18b, which serves as the backing surface of member 18, has a major central portion which is generally sinusoidal when viewed in longitudinal section as in FIG. 1. Thus, surface 18b includes convex apical segments 18c alternating along its length with concave apical segments 18d, the adjacent apical segments 18c and 18d being interconnected by inclined connecting segments 18e. Surface 18b also includes short generally cylindrical segments adjacent its upper and lower edges. Backing member 18 is frangible, preferably being formed of a relatively inexpensive material such as plaster-of-Paris.

After emplacement of backing member 18, additional parts of the supporting assembly are emplaced. Specifically, a pair of semi-annular rigid side members 20 and 22 are positioned to form a complete annulus around mandrel 12 (compare FIGS. 1 and 3). Side members 20 and 22 have respective grooves 20a and 22a configured to mate with flange 12b of mandrel 12 to properly position the side pieces 20 and 22 on the mandrel. The outer surfaces 20b and 22b of side pieces 20 and 22 respectively are inclined inwardly and upwardly. Thus, pieces 20 and 22 may be held in place by a retaining ring 32 having a correspondingly tapered frustoconical inner surface 32a. When ring 32 is emplaced in surrounding relation to side members 20 and 22, the engagement of surface 32a with surfaces 20b and 22b serves to hold member 20 and 22 together with a wedging action while also permitting ring 32 to be supported on members 20 and 22. Alternatively, the side members 20 and 22 may be temporarily held in place by rams or the like acting radially inwardly on the members, or in some cases, by their own weight.

Each of the side members 20 and 22 has, on its radially inner side, a semi-annular recess 20c or 22c respectively. Recesses 20c and 22c carry respective annular bladders 24 and 26 of polyurethane or another suitable elastomer. Bladders 24 and 26 are hollow and encase respective core members 28 and 30. Viewed in longitudinal cross-section, each of the bladders 24 and 26 comprises a relatively thick radially outer portion which is generally U-shaped and fits within the respective recess 20c or 22c. Each bladder further comprises a relatively thin radially inner portion which protrudes from the respective recess 20c or 22c. The surfaces 24a and 26a respectively of these inner bladder portions face generally radially inwardly and oppose the backing surface 18b of backing member 18. Surfaces 24a and 26a serve as the pressing surfaces of the apparatus.

Referring still to FIG. 1, it can be seen that the relatively thin radially inner portions of the bladders 24 and 26, as well as the pressing surfaces 24a and 26a which they define, generally follow the sinusoidal configuration of surface 18b. For example, surface 24a includes concave apical segments 24b each opposed to a respective one of the convex apical segments 18c of backing surface 18b. Alternating with the concave apical segments 24b are convex apical segments 24c each opposed to a respective one of the concave apical segments 18d of the backing surface. Joining adjacent ones of the apical segments 24b and 24c are connecting segments 24d, each inclined to generally parallel a respective opposed one of the connecting segments 18e of the backing surface. In addition, surface 24 has end segments 24e and 24f facing upwardly and downwardly respectively. These segments 24e and 24f adjoin the relatively thick base portion of bladder 24 but are spaced longitudinally inwardly from the upper and lower extremities of said base portion for a purpose to be described more fully below. The relatively thin radially inner portion of bladder 26 is the mirror image of the corresponding portion of bladder 24, and in particular, defines a pressing surface 26a having alternating convex and concave apical segments interconnected by connecting segments, as well as upwardly and downwardly facing end segments, as shown in FIG. 1.

The rigid cores 28 and 30 encased in respective bladders 24 and 26 have external surfaces conforming to the configuration of the internal surfaces of said bladders. Cores 28 and 30 are not bonded or attached to the respective bladders, although in alternate embodiments they could be so attached along the relatively thick outer portions of the bladders. However, the cores do contact the entire inner bladder surfaces when the bladders are in their relaxed positions as shown in FIG. 1. Thus, cores 28 and 30 serve to retain the relatively thick base portions of bladders 24 and 26 in their respective recesses 20c and 22c as well as to form a convoluted support surface for the relatively thin inner bladder portions. Cores 28 and 30 may thus be considered part of the supporting assembly of the apparatus.

It can be seen that a generally annular convoluted first chamber is defined between the backing surface 18b of backing member 18 and the pressing surfaces 24a and 26a of bladders 24 and 26. A pair of generally semi-annular second chambers may be said to be formed within the bladders 24 and 26 respectively and particularly between the thin convoluted inner portions thereof and the adjacent core surfaces. With the bladders in their relaxed positions, as shown in FIG. 1, the second chambers are of negligible volume due to the abutment of the bladders with their respective cores 28 and 30. However, it can be seen that, by introducing fluid to the interfaces between the convoluted portion of each bladder and its core, the relatively thin inner or convoluted portions of the bladders may be advanced toward the backing surface 18b of the backing member, and by withdrawing fluid from the interiors of the bladders, the relatively thin convoluted bladder portions, may be retracted away from backing surface 18b. Thus, the relatively thin convoluted bladder portions serve as pressing members which may be advanced toward and retracted from backing surface 18b to respectively contract and expand the first chamber formed between backing surfaces 18b and pressing surfaces 24a and 26a. These pressing members are sufficiently elastomeric to prevent such movement, but do retain their basic convoluted configuration.

In order to provide for such introducing of fluid to the interiors of the bladders as well as the withdrawal of such fluid, passageways are provided through the support assembly. In particular, the relatively thick base portion of bladder 24 has a radial bore 24g therethrough aligned with bores 34 and 36 through core 28 and side member 20 respectively. A nipple 38 is mounted in bore 24 and extends into enlarged portions of bores 34 and 36 to connect the latter two bores and the members in which they are formed. Bore 36 has its radially outer end closed by a plug 40. Another bore 42 intersects bore 36 intermediate its ends and extends downwardly therefrom through side member 20 and has its lower end closed by a plug 44. Bore 42 is intersected just above its lower end by a short radial bore 46 extending outwardly through side member 20 and having its outer end enlarged and threaded as indicated at 46a for connection to a fitting at the end of a hydraulic line. When such a line is connected at 46a, hydraulic fluid can be admitted to the chamber within bladder 24 via bores 46, 42 and 36, nipple 38, and bore 34. Such fluid can likewise be removed from the chamber formed within bladder 24 via the same passageway system. A similar passageway system (not shown) is provided for introducing hydraulic fluid into the chamber formed within bladder 26 and removing such fluid.

When the parts of the apparatus heretofore described have been assembled, a particulate material, specifically a powdered thermosetting plastic 56 such as a tetrofluoroethylene, is introduced into the first chamber defined by surfaces 18b, 24a, 26a and the upper surface of ring 16. The chamber is filled with such powder. The apparatus is vibrated or tapped with a suitable tool to cause the powder to settle into all portions of the chamber and eliminate air pockets. Additional powder may be added as needed to completely fill the chamber.

Assuming ring 32 has already been emplaced, the chamber may then be closed by a ring 48 having a sliding fit on the unthreaded part of upper portion 12f of mandrel 12. The abutting radial surfaces of ring 48 and side members 20 and 22 are downwardly and inwardly tapered as shown so that, as ring 48 is moved downwardly on mandrel 12, it will be stopped in a position such that its lower surface is flush with the upper end walls of recesses 20c and 22c. As mentioned hereinabove, the end segments, e.g. 24e and 24f of the pressing surfaces 24a and 26a are spaced longitudinally inwardly from the longitudinal extremities of the thick base portions of the bladders which fill recesses 20c and 22c, and thus from the upper and lower surfaces of rings 16 and 48, respectively. Thus, these end segments define, with rings 16 and 48, radially extending portions of the first chamber for receipt and formation of end flanges on the plastic article to be formed. After ring 48 has been properly emplaced, an annular cover 50 having a central bore for receipt of upper mandrel portion 12f may be emplaced. Cover 50 is secured to retaining ring 32 by screws, one of which is shown at 52, and to ring 48 by other screws, one of which is shown at 54. Additional screws, one of which is shown at 55, are threaded into cover 50 to abut the upper surface of ring 32. Thus, by manipulating screws 55 and 52, it is possible to adjust the relative positioning of members 32, 48 and 50, which together form a closure assembly. Specifically, the tightness with which such assembly will engage side members 20 and 22 may be adjusted.

As mentioned above, the ring 32, in many instances, may not be placed on members 20 and 22 prior to filling of the first chamber with powder 56. In such instances the closure assembly 32, 48, 50 may be pre-assembled and placed on the members 20, 22 as a unit. Or ring 32 may be pre-placed and members 48 and 50 pre-assembled and mounted as a unit. In any event, a large nut 59 is threaded onto the upper end of mandrel portion 12f to retain the closure assembly 32, 48, 50 in place.

With the apparatus thus completely assembled, hydraulic fluid is introduced into the second chamber defined within bladders 24 and 26 to advance the thin inner portions or pressing members thereof as shown in FIG. 2. This contracts the first chamber formed between surfaces 18b, 24a and 26a, and rings 16 and 48 to compact the powdered plastic 56 therein. The surface irregularities in the particles are thus forced into interlocking engagement so that the individual particles are joined to form a solid article, in this case a plastic preform 56' for an expansion joint. Such article has radially extending end flanges 56a and 56b and a convoluted generally sinusoidal central portion, all corresponding to the general configuration of said first chamber. More specifically, the central portion of the preform has apical segments 56b, alternately inwardly and outwardly concave, and interconnected by inclined connecting segments 56c.

As mentioned hereinabove, pressing surfaces 24a and 26a generally follow the configuration of backing surface 18d. However, these surfaces are not truly parallel. Rather, the backing member 18 and the bladders 24 and 26 (more particularly the pressing members formed by the relatively thin inner portions thereof) are configured so that the backing and pressing surfaces are spaced apart by a greater distance at the respective opposed apical segments thereof than at the respective opposed connecting segments thereof. Accordingly, the preform produced by the apparatus is thicker at its apical segments 56b than at its connecting segments 56c. This is desirable since, in an expansion joint, the greatest strength is needed at the apical segments. Thus, the expansion joint produced by the apparatus and method of the invention incorporates a superior quality impossible to obtain with prior art techniques in which a cylindrical sleeve is formed from the powdered plastic, completely sintered, and then stretched or deformed into the desired convoluted configuration.

After formation of preform 56', fluid is withdrawn from the second chamber within bladders 24 and 26 to retract the pressing members formed by the thin inner portions of said bladders. Nut 59 is then removed from mandrel 12, and closure assembly 32, 48, 50 is removed from side members 20 and 22. Next, the side members themselves are removed from the base 10 and mandrel 12. Removal of the side members is facilitated by the provision of a flange 60 extending laterally outwardly from member 20 for grasping said member and removing it. Member 22 would have a similar flange (not shown). Preform 56' and backing member 18 are next removed, as a unit, from mandrel 12 by sliding them upwardly therealong. To facilitate such removal, a plurality of pushrods 62 are longitudinally slidably mounted in base 10 and the enlarged lower portion of mandrel 12 to abut the ring 16. Thus, by pushing upwardly on rods 62, backing member 18 and preform 56' may be urged upwardly, with ring 16 serving as a bearing member.

Figure 4:
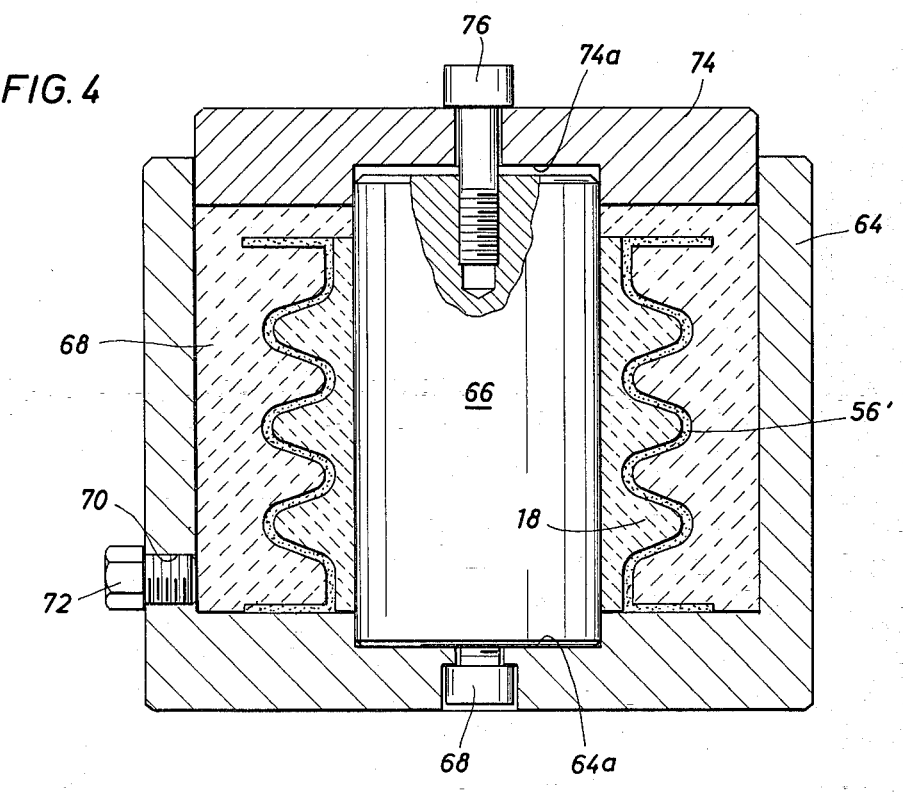
FIG. 4 is a longitudinal sectional view of an apparatus for sintering the article formed in the press of FIGS. 1–3.

The preform 56' thus produced is sufficiently solid to hold the desired shape in the absence of any substantial loading, but is nevertheless relatively porous and brittle. In order to set the plastic and form a strong homogenous article, preform 56' must be sintered or heated. FIG. 4 shows an apparatus for sintering the preform 56'. This apparatus includes a bowl-shaped chamber structure 64 having cylindrical side walls and a generally planar bottom wall. The bottom wall has an internal recess 64a for receipt of the lower end of a mandrel 66. The bottom wall of chamber structure 64 is bored and the lower end of mandrel 66 is provided with a threaded bore whereby they may be removably secured together by a screw 68. The outer diameter of mandrel 66 is equal to that of the portion 12e of the mandrel 12 of the press previously described. Thus, backing member 18 may be slidably mounted on mandrel 66 along with the surrounding preform 56' as shown, with the lower ends of member 18 and preform 56' resting on the bottom wall of chamber structure 64. Thus, the lower and radially inner surfaces of preform 56' are in abutment with the bottom wall of chamber structure 64 and with backing member 18 respectively. However, the radially outwardly facing surface and the upper surface of preform 56' are left free or exposed. In accord with the present invention, a filler is introduced into chamber structure 64 so that it contacts these free surfaces and fills the space between preform 56' and the chamber structure. Preferably, the filler is a flowable substance which can be poured into chamber structure 64 and will flow into and around the convolutions of preform 56', conforming thereto. In the embodiment shown, the filler medium is plaster-of-Paris 68 which may be poured into chamber structure 64 via a fitting (not shown) for a threaded radial bore 70 near the lower end of the side walls of said structure and/or through the open upper end of structure 64. Bore 70 may then be closed by a plug 72. Chamber structure 64 may then be vibrated or tapped lightly with a suitable tool to release any air which may be trapped in the plaster and to cause the plaster to settle into the convolutions of preform 56'. More plaster may then be added through the upper end of chamber structure 64 as needed. It will be noted that both chamber structure 64 and mandrel 66 extend upwardly substantially beyond the upper end of preform 56' whereby the plaster 68 may be poured over the free upper surface of the preform.

Plaster 68 is allowed to set to form a solid filler member. The chamber is then closed by a generally disc-shaped cover 74 sized to slidably fit within chamber structure 64 and having a central recess 74a for receipt of the upper end of mandrel 66. Cover 74 and mandrel 66 are threaded to receive a screw 76 for retaining the cover in place.

The entire assembly pictured in FIG. 4 is then placed in a suitable oven and sintered or heated. During the heating process, preform 56' will tend to expand. Although the plaster members 18 and 68 and the surrounding metal chamber structure 64 may also expand slightly, chamber bowl 64 and mandrel 66 will generally restrict movement of the plaster members radially, i.e. away from each other. Accordingly, members 18 and 68 will serve as restraining means providing a reaction to the expansive forces of preform 56', and this force will be substantially evenly distributed over all the surfaces of the preform. This reaction force substantially improves the physical properties of the finished article produced from preform 56', and can even serve to "heal" cracks or other defects in the preform. Nevertheless, it will be appreciated that these effects are achieved without the need for the active exsersion of high external pressures on the preform, and thus without complicated and expensive equipment. On the contrary, a relatively simple chamber structure is utilized which merely provides sufficient support to resist movement of the plaster members, and the expanding preform itself provides the necessary force.

After heating, the entire apparatus of FIG. 4 is cooled. Screw 76 is then removed, as is cover 74. Next, mandrel 66 may be released by removal of screw 68, and then lifted upwardly and out of the surrounding plaster member 18. If needed, push rods may be provided in the lower wall of chamber bowl 64 to facilitate removal of the mandrel. Finally, the finished convoluted joint formed from preform 56' is removed from the chamber bowl along with the engaged plaster members 18 and 68. Because the latter members are frangible and relatively inexpensive, they can then be removed from the convoluted joint by simply fracturing them, removing the fragments thereof, and discarding them. The plaster-of-Paris is sufficiently inexpensive so that new plaster members may be employed for each joint which is produced. The frangibility of these members allows a relatively complicated convoluted member to be formed without the need for expensive breakdown mold pieces, or sacrificing of the optimum configurational and physical properties of the finished article. It can also be appreciated that, even if preform 56' is to be sintered according to a method other than that prescribed above, backing member 18 can be fractured and removed from the preform prior to sintering. For example, in some processes, it may be desirable to so remove the backing member and pour wet plaster into the interior of the preform prior to sintering in substantially the same manner as plaster 68 is poured around the exterior of the preform. Also, in some types of articles in which the optimum physical properties achieved by the aforementioned sintering methods are not necessary, the preform may be sintered in a more conventional free-sintered mode.

The sintering method of the present invention has even further advantages when adapted for the heating of articles comprised of two interengaged bodies having incompatible coefficients of thermal expansion. An example of such an article is the combination valve stem and disc for a butterfly valve shown in FIGS. 5 and 6. This article comprises an inner metal body which includes a central disc-shaped core 80 with integral valve stem portions 82 and 84 extending therefrom. At the juncture of each of the valve stem portions 82 and 84 with the disc portion 80, there is a respective annular groove 86 or 88. A second generally disc-shaped body 90 of a thermosetting plastic surrounds the central portion of the metal body including the disc portion 80, the grooves 86 and 88, and the adjacent inner extremities of the valve stem portions 82 and 84. Body 90 is formed around the metal body 80, 82, 84 by a pressing process, preferably an isostatic molding process, so that it exists in a preform state which must be sintered. The plastic preform body 90 extends into and fills the grooves 86 and 88, forming therewith interlock formations. It can be seen that if this article were sintered in a free-centered condition, i.e. with the outer surfaces of body 90 exposed or free, the metal body would resist inward expansion of body 90, while the interlocking of body 90 with grooves 86 and 88 would resist longitudinal expansion. Accordingly, the body 90 could only expand laterally outwardly and might tend to buckle along its outer surfaces.

Figure 6:
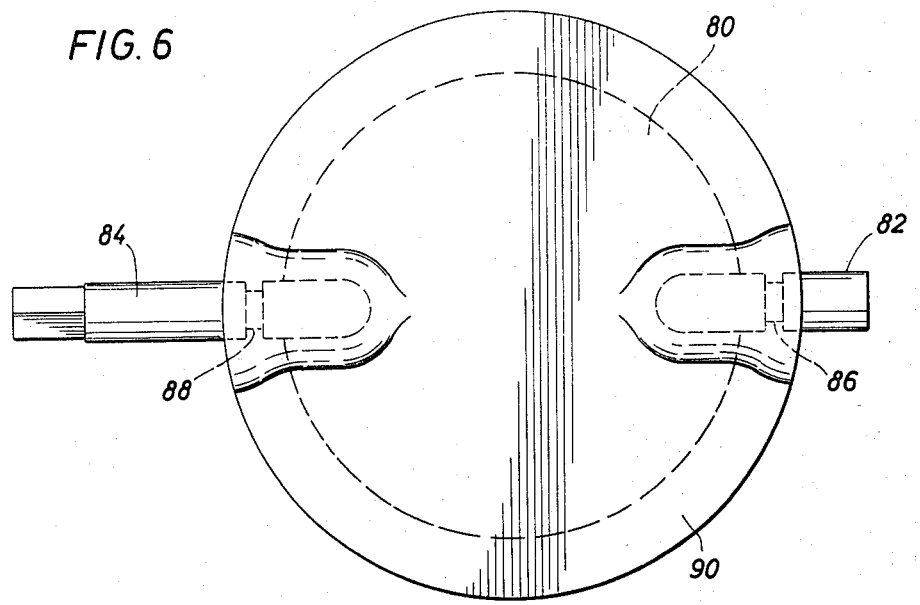
FIG. 6 is an elevational view of the article to be treated in the apparatus of FIG. 5, viewed in the direction indicated by arrows 6—6 in FIG. 5.
Figure 5:
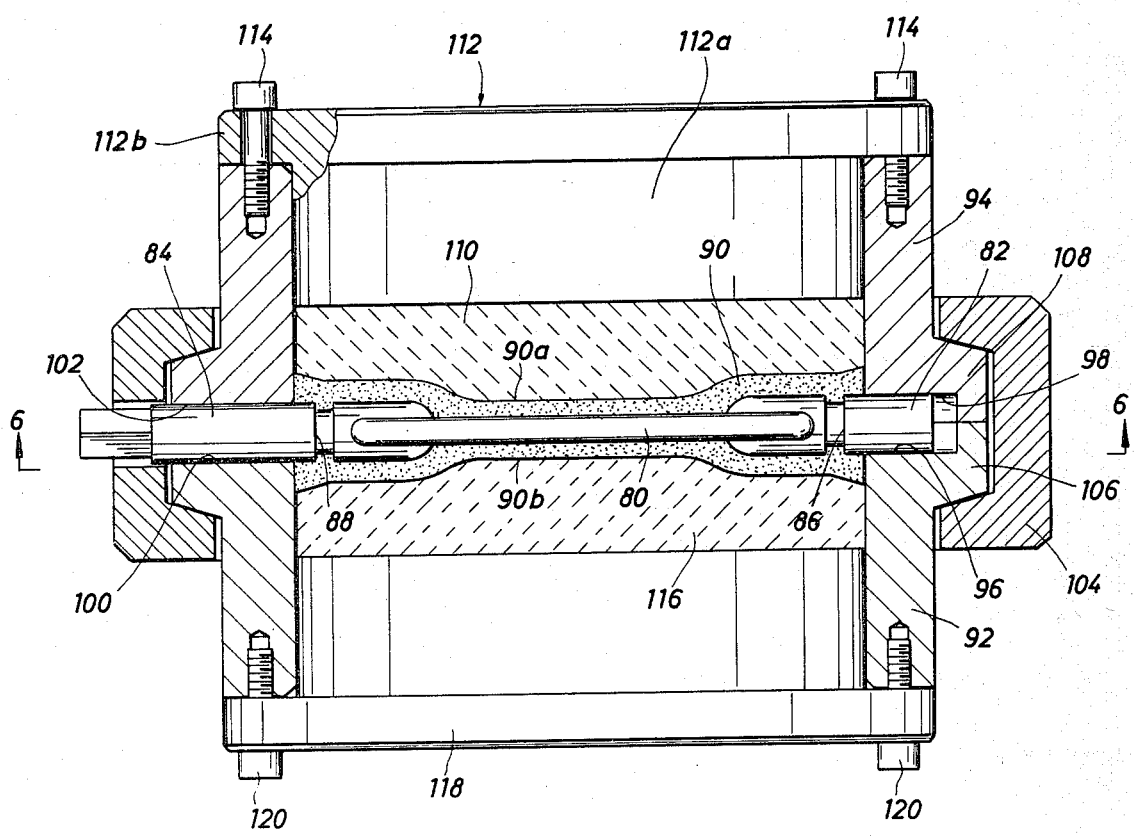
FIG. 5 is a sectional view of an apparatus for sintering a different type of article.

To resolve this problem, while simultaneously producing an article in which the plastic portion has superior physical properties, the article is sintered in an apparatus such as that shown in FIGS. 5 and 6 in accord with the present invention. Said apparatus comprises a pair of generally cylindrical chamber members 92 and 94. When placed in end-to-end abutment, members 92 and 94 define a large cylindrical chamber having an inner diameter substantially equal to that of the disc-shaped body 90. Body 90 and the enclosed portions of the metal body, 80, 82, 84, are positioned within the cylinder defined by members 92 and 94, the abutting surfaces of said members being recessed as indicated at 96, 98, 100 and 102 to accommodate the parts of valve stem portions 82 and 84 which extend outwardly from plastic body 90. Chamber members 92 and 94 may then be secured together by an annular clamp 104 which engages annular flange 106 and 108 on members 92 and 94 respectively. With the valve element thus mounted in the apparatus, the body 90 thereof has two free or exposed surfaces 90a and 90b generally defining the opposite sides of the valve disc. Fillers are then introduced into the chamber defined by members 92 and 94 in contact with surfaces 90a and 90b. While such fillers may be flowable media, as in the embodiment of FIG. 4, the relatively uncomplicated configuration of surfaces 90a and 90b makes it more feasible to use prefabricated solid filler members. In any event, the filler media or members are preferably formed of an inexpensive frangible material such as plaster-of-Paris.

A first filler member 110 may be provided either by pouring wet plaster through the adjacent open end of the cylindrical chamber structure, i.e. the end defined by member 94, or by inserting a prefabricated plaster member, formed to match the configuration of surface 90a, through said open end. If the wet plaster is used, it is then allowed to set to form a solid filler member 110. Member 110 is then fixed in place by a cover 112 having a plug portion 112a sized to fit within the chamber structure and a flange portion 112b disposed to overlie the outer end of chamber member 94. Plug portion 112a is advanced into chamber member 94 until it abuts filler member 110, and then flange portion 112b is secured to chamber member 94 by screws 114 to retain cover 112 in that position so that it will resist movement of filler member 110 away from the metal body 80, 82, 84. The apparatus is then inverted and a similar insert member 116 is installed in chamber member 92 in contact with free surface 90b of body 90 in substantially the same manner as with filler member 110. Filler member 116 is then retained in place by a cover 118, identical to cover 112, secured to chamber body 92 by screw 120.

The entire assembly pictured in FIG. 5 is then placed in an oven for sintering of body 90. As the assembly is heated, body 90 will tend to expand. As mentioned above, the metal body encased within plastic body 90 inhibits expansion of the latter in any direction other than laterally outwardly. However, as body 90 tends to expand laterally outwardly the filler members 110, and 116 abutting surfaces 90a and 90b provide a resistance force. While the filler members 110 and 116 and the chamber structure and covers may expand slightly, the covers 112 and 118 offer sufficient resistance to movement of filler members 110 and 116 away from metal body 80, 82, 84 to permit the filler members to provide a substantial resistance force along surfaces 90a and 90b of plastic body 90. Because the filler members abut substantially the entirety of these surfaces, this resistance force prevents buckling of the plastic body along surfaces 90a and 90b. In addition, the use of the filler members provides all the advantages described in connection with the embodiment of FIG. 4, in particular, improved physical properties of the resulting plastic article and healing of cracks or other defects in the preform.

After the apparatus has been cooled, screws 114 and 120 are removed, covers 112 and 118 are removed, clamp 104 is disengaged, and the chamber members 92 and 94 are separated. It may be possible to simply lift the filler members 110 and 116 from the finished plastic body 90. However, if necessary, members 110 and 116 may be fractured for removal and the fragments discarded due to the frangibility and inexpensive nature of the members.

While the foregoing represents preferred embodiments of the methods and apparatus of the present invention, numerous variations of those methods and the apparatus are encompassed within the spirit of the invention. For example, in the press apparatus illustrated in FIGS. 1-3, two separate semi-annular bladders are employed to define the pressing means. This allows for easy disassembly of the apparatus to permit removal of the finished preform. However, if the cores 28 and 30 were omitted, and the bladder material sufficiently flexible, a single annular bladder could be employed. Various other changes in the configuration of the various parts of the apparatus could also be made, and in particular, the apparatus could be adapted to mold articles having different configurations from the convoluted sleeve illustrated. The backing member 18, while disclosed as being comprised of plaster, could also be comprised of other frangible materials. The inexpensive nature of the backing member makes it possible to use a new backing member for each article molded, merely fracturing and discarding the backing member after the molding process is completed. The backing surface of the backing member can be configured to form various types of convolted or otherwise irregular, i.e. non-planar, surfaces which, due to their shape and/or position on the article being formed, would be difficult to mold with conventional isostatic apparatus.

In connection with the heating portions of the process illustrated in FIGS. 4 and 5 it is possible to use either prefabricated solid filler members or flowable filler media, as mentioned above. While plaster-of-Paris may be advantageously used in either the flowable or solid form, numerous other materials may be used. For example, if prefabricated filler members are to be employed, they may be formed of a suitable metal. If a flowable medium is employed, it may comprise a liquid, a semi-liquid, or even a granular material such as sand, as long as it is sufficiently flowable to conform to the configuration of the free surface or surfaces of the body to be heated. Again, the medium is preferably an inexpensive one which can be discarded after each heating process. Various changes can also be made in the apparatus used to retain the filler media or members in place, and in particular, such means may be varied in accord with the configuration of the article being treated.

Numerous other modifications will suggest themselves to those of skill in the art. Accordingly, it is intended that the scope of the invention be limited only by the claims which follow.

We claim:

1. A press apparatus for forming a solid article from a particulate material comprising:
    a supporting assembly;
    a frangible backing member removably mounted on said supporting assembly and having a backing surface;
    a pressing means mounted on said supporting assembly and having a pressing surface opposed to said backing surface, said supporting assembly being cooperative with said backing member and said pressing means to define a first chamber between said backing surface and said pressing surface for receipt of said particulate material, and said pressing means being advanceable and retractable toward and away from said backing surface to contract and expand said first chamber;
    closure means for selectively opening and closing said first chamber; and
    means for selectively advancing and retracting said pressing means.

2. The apparatus of claim 1 wherein said backing member is comprised of plaster.

3. The apparatus of claim 1 wherein said supporting assembly further defines with said pressing means second chamber means located across said pressing means from said backing member and said means for advancing and retracting said pressing means comprises means for selectively introducing fluid into and removing fluid from said second chamber means.

4. The apparatus of claim 3 wherein said pressing means comprises elastomeric diaphragm means.

5. The apparatus of claim 4 wherein said backing and pressing surfaces are generally annular and coaxial.

6. The apparatus of claim 5 wherein said supporting assembly includes a mandrel and said backing member is generally annular and slideably mounted on said mandrel, said backing surface facing generally radially outwardly therefrom, and said pressing means surrounding said backing member.

7. The apparatus of claim 6 wherein said backing and pressing surfaces are longitudinally convoluted, including respective alternating apical segments and connecting segments, said backing and pressing surfaces being generally parallel but spaced apart by a greater distance between respective opposed ones of said apical segments than between respective opposed ones of said connecting segments.

* * * * *